April 22, 1941.   A. M. STENGER   2,239,405
CHECK VALVE
Filed April 21, 1939
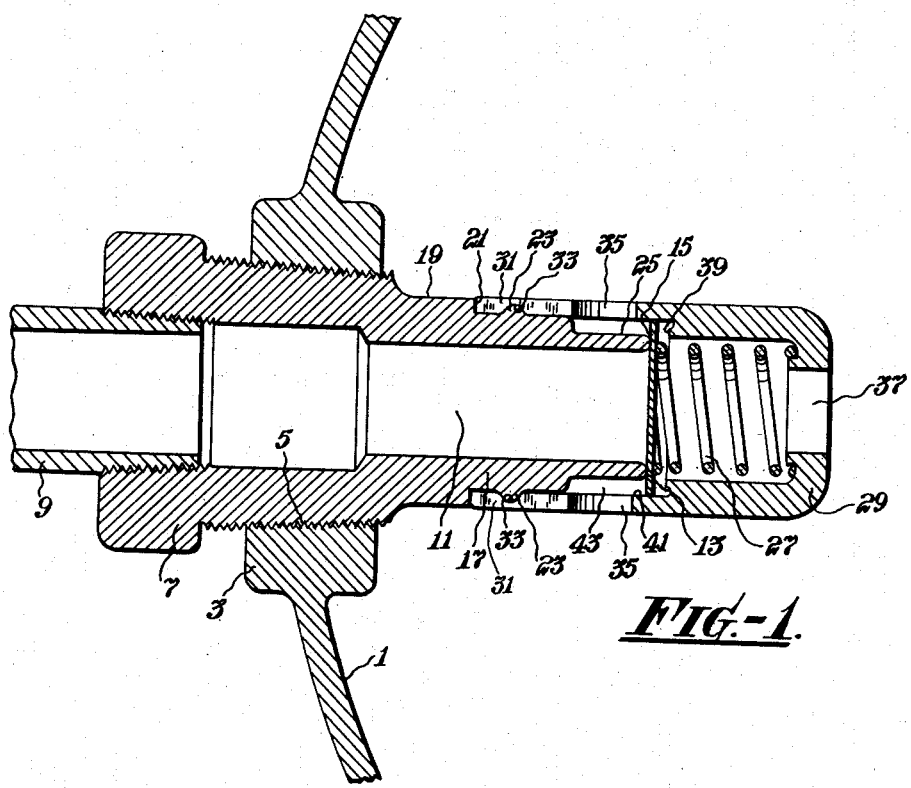
FIG.-1.
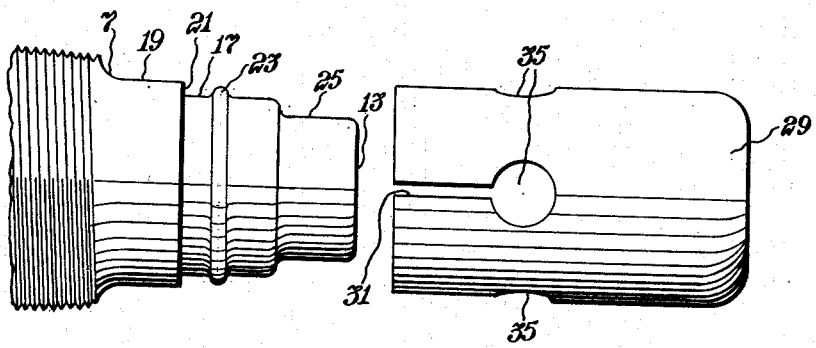
FIG.-2.   FIG.-3.
INVENTOR
*August M. Stenger*
BY
ATTORNEY Patented Apr. 22, 1941

2,239,405

UNITED STATES PATENT OFFICE 2,239,405

CHECK VALVE

August M. Stenger, Painted Post, N. Y., assignor to Ingersoll-Rand Company, Jersey City, N. J., a corporation of New Jersey Application April 21, 1939, Serial No. 269,122

2 Claims. (Cl. 251—119)

This invention relates to a check valve and, more particularly, to an all-metal check valve adapted for use in the receiver tank of a fluid compressor.

There are various objections to the known types of check valves when they are employed in a fluid compressor receiver tank in that they deteriorate fast and cease functioning with the result that they must be removed. The removal of these check valves for repair has not only been difficult but in assembling and disassembling them there has been great hardship.

It is, accordingly, an object of the present invention to provide a metal check valve for a fluid compressor which will not deteriorate or corrode.

Another object is to provide a check valve for a fluid compressor which is easily assembled and disassembled.

A further object is to provide a check valve for a fluid compressor which may be easily inserted and removed from a chamber.

A still further object is to provide a check valve for a fluid compressor which may be assembled before mounting it on the fluid compressor.

Another object is to provide a check valve for a fluid compressor which is simple in construction, easy to repair, durable, practical and inexpensive.

These and other objects will be readily apparent from the following description of which the drawing forms a part and in which Figure 1 is a view in section of a preferred embodiment of the present invention.

Figure 2 is an elevational view of the valve body shown in Fig. 1.

Figure 3 is an elevational view of the valve shown in Fig. 1.

With reference to Fig. 1, a portion of the receiver tank 1 of a fluid compressor is provided with the boss 3. Threads 5 are provided on the boss to receive the valve body 7 and to engage it in fluid tight relationship. The valve body 7 is threaded at its outer end to receive the conduit 9 which leads to the fluid compressor (not shown). The conduit or pipe 9 opens into the passage 11 running through the valve body. At the inner end of the valve body 7 is the valve seat 13 on which rests a valve disk or diaphragm 15 preferably manufactured of stainless steel.

The body 7 has a portion 17 of smaller diameter than the portion 19 in order to provide a shoulder 21. Furthermore, the portion 17 has a ferrule 23 near the mid portion thereof. Beyond the portion 17 near the inner end of the body the outer diameter of the valve body is again reduced as shown at 25. The diaphragm valve 15 is normally maintained on its seat by a spring 27 made of rustless material and the spring, in turn, is restrained by the cap 29. The cap is split as at 31 in order that it may be placed on the valve body 7. The inner wall of the cap has a recess 33 to coact with the ferrule 23. Thus, since the cap is split as at 31 it can be sprung enough to permit the edge of the cap to rest against the shoulder 21 and will be prevented from slipping or falling off the body by the coaction of the ferrule 23 and recess 33.

Arranged around the circumference of the cap are apertures 35. These apertures are so spaced with respect to the valve seat 13 that they will be below or to the left of the valve seat 13 as seen in Fig. 1. The end of the cap 29 has a port or opening 37 through which fluid may pass. The diameter of the passage extending through the cap is reduced above or to the right of the valve 15 as seen in Fig. 1 in order to provide a stop 39. Thus, the valve 15 is guided by the wall 41 of the cap 29, when opening, and is limited in the degree of opening by the stop 39. By making the internal diameter of the wall 41 larger than the remainder of the passage through the cap 29 and making the portion 25 of the valve body of a smaller diameter, the passage 43 is provided between the seat 13 and the apertures 35.

With this arrangement fluid may enter through the conduit 9 and the passage 11. The pressure of the fluid will overcome the resistance of spring 27 thus raising valve 15 from its seat 13. The fluid may then flow by the seat 13, through the passage 43 and apertures 35 into the receiver tank 1. Should the flow of fluid through the conduit 9 cease for any reason, the fluid in the receiver tank will aid spring 27 in closing the valve 15, since the entire valve is exposed to the pressure of the fluid in the receiver through port 37. So long as the pressure supplied by conduit 9 exceeds the pressure in the receiver tank 1 and the pressure of the spring, fluid will flow into the receiver. The receiver pressure is not effective over the entire area of the valve 15, but only over that portion that covers passage 11.

By constructing a check valve in this manner it is possible to assemble the check valve while the valve body is outside of the receiver and then insert it in the receiver. Thus, the repair and mounting of the check valve is very much simplified.

I claim:

1. In a check valve adapted for use in the receiver tank of a fluid compressor, the combination of a valve body adapted to be secured in the receiver, a seat on the body, a round metal diaphragm valve to rest on the seat, a split cap having a round inner wall to guide movement of the valve, a ferrule on the body, a recess on the cap to coact with the ferrule and hold the cap on the body, a spring between the diaphragm valve and cap to normally maintain the diaphragm valve on its seat, apertures in the cap arranged below the seat when the cap is on the body to enable fluid flowing by the valve seat when the diaphragm valve is open to flow from said cap, and a port in the cap arranged above the diaphragm valve when the cap is on the body to enable fluid to enter the cap to hold the diaphragm valve on the seat.

2. In a check valve adapted for use in the receiver tank of a fluid compressor, the combination of a valve body adapted to be secured in the receiver, a seat on the body, a round metal diaphragm valve to rest on the seat, a split cap having a round inner wall of substantially the same diameter as and guiding the valve, a ferrule on the body, a recess on the cap to coact with the ferrule and hold the cap on the body, a spring between the diaphragm valve and cap to normally maintain the diaphragm valve on its seat, a stop on the cap above the valve seat to limit opening movement of the diaphragm valve, apertures in the cap arranged below the seat when the cap is on the body to enable fluid flowing by the valve seat when the diaphragm valve is open to flow from said cap, and a port in the cap arranged above the diaphragm valve when the cap is on the body to enable fluid to enter the cap to hold the diaphragm valve on the seat.

AUGUST M. STENGER.